United States Patent [19]

Shanley, II et al.

[11] Patent Number: 4,554,577

[45] Date of Patent: Nov. 19, 1985

[54] KEYED DC STABILIZATION SYSTEM WITH PROTECTION FROM ERROR INTRODUCTION DURING VERTICAL SYNC INTERVAL

[75] Inventors: Robert L. Shanley, II; Thomas D. Yost; William A. Lagoni, all of Indianapolis, Ind.

[73] Assignee: RCA Corporation, Princeton, N.J.

[21] Appl. No.: 561,280

[22] Filed: Dec. 14, 1983

[51] Int. Cl.⁴ .............................................. H04N 5/68
[52] U.S. Cl. ........................................ 358/34; 358/74
[58] Field of Search .................. 358/21 R, 33, 34, 74, 358/242, 243

[56] References Cited

U.S. PATENT DOCUMENTS

| | | | |
|---|---|---|---|
| 4,183,050 | 1/1980 | Tsuchiya et al. | 358/34 |
| 4,263,622 | 4/1981 | Hinn | 358/74 |
| 4,484,228 | 11/1984 | Parker | 358/74 |

*Primary Examiner*—Michael A. Masinick

*Attorney, Agent, or Firm*—Eugene M. Whitacre; Paul J. Rasmussen; William H. Meagher

[57] ABSTRACT

DC stabilization system for a color TV receiver includes three control loops, each including a keyed comparator for comparing a respectively different one of a set of blue, green and red color signals with a common reference voltage during keying periods determined by line rate keying of "backporch" timing pulses. The output of the keyed comparator responding to the blue signal adjusts the DC level of a luminance signal component used in color signal formation. The output of the keyed comparator responding to the red signal adjusts the DC level of an I color-difference signal component used for color signal formation. The output of the keyed comparator responding to the green signal adjusts the DC level of a Q color-difference signal used for color signal formation. The line rate keying pulse source is subject to field-rate blanking to preclude comparator keying during significant portion of received signal's vertical sync interval.

7 Claims, 3 Drawing Figures

KEYED DC STABILIZATION SYSTEM WITH PROTECTION FROM ERROR INTRODUCTION DURING VERTICAL SYNC INTERVAL

The present invention relates generally to DC stabilization systems for use in color television receivers, and particularly to systems for stabilizing the DC levels of the respective color signal drives for a color kinescope in which protection is afforded against error introduction during the vertical sync interval of the received signals.

A well known technique for DC stabilization in television systems uses some form of keyed clamp circuit to clamp the received signal to a reference level during the "backporch" segment of the signal's horizontal retrace intervals. In conventional arrangements for developing line rate keying pulses for such keyed clamp circuits, which arrangements operate in response to horizontal flyback pulses derived from the receiver's deflection circuits, and/or in response to a differentiated version of a composite sync signal separated from the received signal, the train of developed keying pulses includes pulse components appearing during the vertical sync interval. Keying of the clamp circuit in response to such pulse components can introduce a DC error that may not be fully dissipated by the beginning of the display of the top of the television picture, with a consequence of an undesirable vertical shading of the displayed picture.

The present invention is directed to a DC stabilization system for color television receivers employing DC level control loops with voltage comparators keyed by line rate keying pulses with "backporch" timing, wherein the source of line rate keying pulses is rendered responsive to field rate pulses in such manner as to preclude keying of the voltage comparators during at least some of the line intervals occupied by the vertical synchronizing component. The keying preclusion can be of aid in eliminating or reducing the visibility of the aforementioned vertical shading effect.

The protection afforded against error introduction during the vertical sync interval by a DC stabilization system in accordance with the present invention is of special importance in color television receivers of the type incorporating apparatus for automatic control of color kinescope biasing.

An illustrative arrangement for automatic control of color kinescope biasing in a color television receiver is that described in U.S. Pat. No. 4,263,622 - Hinn. In the Hinn arrangement, a control period, occupying a period of several successive line intervals within a post-sync portion of each vertical blanking interval, is set aside for monitoring a black level current produced by an electron gun under reference signal conditions, for detection of departures from a desired current level, and for readjustment of gun bias to oppose the undesired departures. During a portion of the control period, the color kinescope grid receives a conduction-enhancing pulse; bias control is based upon information derived as indicative of the change in cathode current level introduced by the grid pulsing. An advantageous system for utilization of the above-described Hinn approach in maintenance of an appropriate bias relationship among the color kinescope's gun trio (in the face of aging and other parameter variations) is described in U.S. Pat. No. 4,484,228 of R. P. Parker.

In color television receivers employing automatic kinescope bias (AKB) control circuits of the type exemplified by the structures of the aforementioned Hinn patent and Parker patent, the residue of DC level errors built up during a vertical sync interval may, at the onset of the AKB control interval shortly thereafter, be of sufficient magnitude as to result in erroneous bias settings by the AKB control circuits. In instances where the resultant bias errors are not matched, an undesired background coloring can be a consequence. Where, however, a DC stabilization system in accordance with the present invention is employed, the above-noted keying preclusion within the vertical sync interval ameliorates the problem of erroneous bias settings by the subsequent AKB control circuits.

In a DC stabilization system in accordance with an illustrative embodiment of the present invention, a trio of control loops is provided, each including a keyed voltage comparator for comparing a respectively different one of a set of color signals with a common reference voltage during "backporch" keying periods defined by the output pulses provided by a source of line rate keying pulses. In the first control loop, the keyed comparator's output is used to adjust the DC level of a luminance signal input to signal combining means which form the set of color signals. In the second control loop, the keyed comparator's output is used to adjust the DC level of a first color-difference signal input to the signal combining means. In the third control loop, the keyed comparator's output is used to adjust the DC level of a second color-difference signal input to the signal combining means. The source of line rate keying pulses is rendered responsive to field rate pulses (e.g., vertical sync pulses, or vertical drive pulses) indicative of the timing of the appearance of the received signal's vertical synchronizing component. The response to the field rate pulse is such as to bar the keying of the loop's comparators during all, or a major portion of, the received signal's vertical sync interval.

Illustratively, the keying pulse source comprises a sandcastle pulse encoding/decoding system, with the sandcastle pulse encoder subject to field rate keying to effect the desired comparator keying pulse deletions.

In the accompanying drawing

Figure 1:
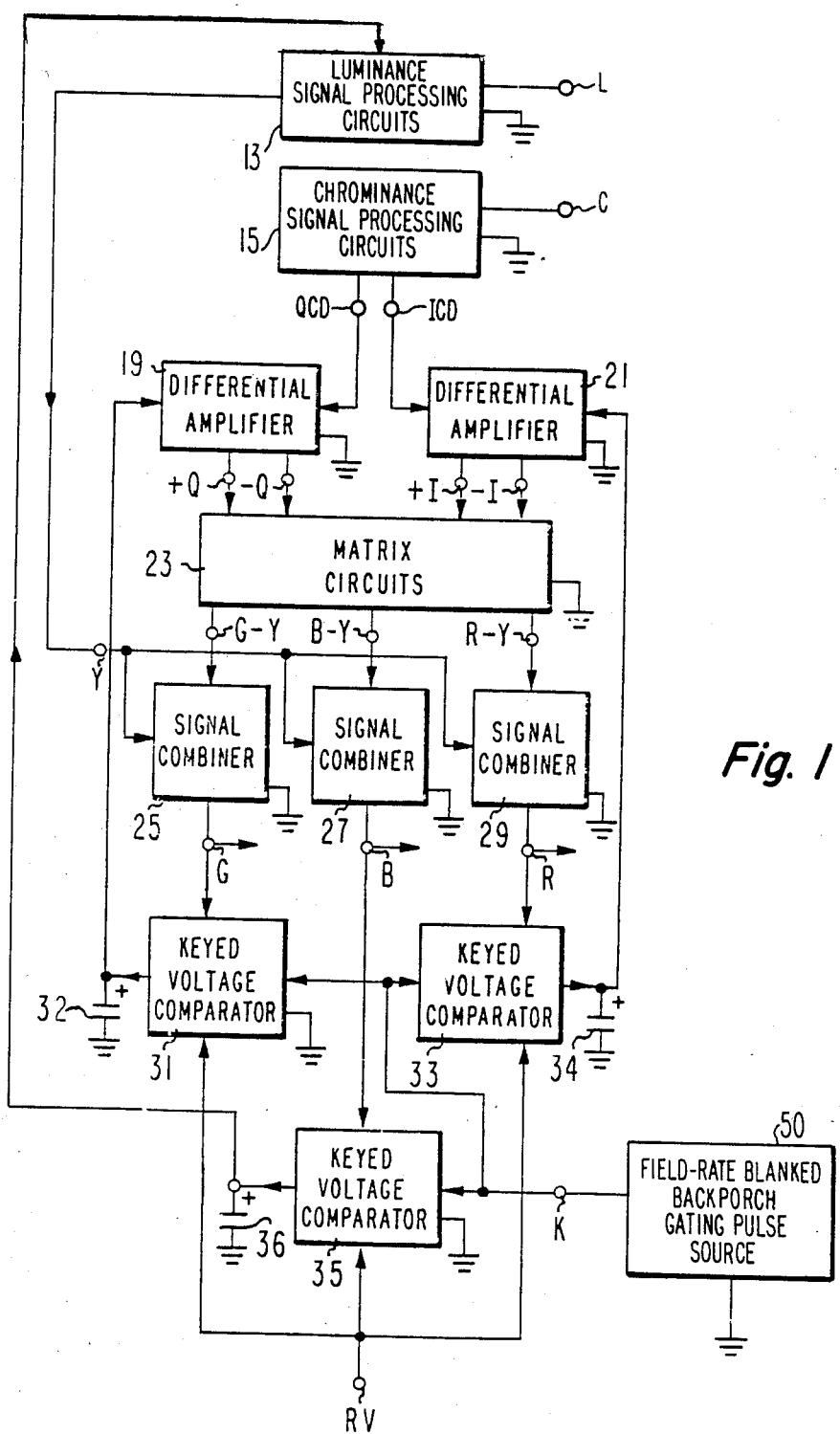
FIG. 1 illustrates, partially schematically and partially by block representation, a portion of a color television receiver incorporating a DC stabilization system in accordance with an embodiment of the present invention.

In the system of FIG. 1, luminance signals appearing at terminal L are applied to the input of luminance signal processing circuits 13. Illustratively, the luminance signals appearing at terminal L may comprise the luminance signal output of comb filter apparatus (of the type shown in U.S. Pat. No. 4,096,516—Pritchard, for example), employed in a color television receiver to separate the luminance and chrominance components of a received composite signal. The output of the luminance signal processing circuits 13, appearing at terminal Y, is supplied as a luminance signal input to a trio of signal combiners 25, 27 and 29.

Chrominance signals appearing at terminal C are applied to the input of chrominance signal processing circuits 15. Illustratively, the chrominance signals appearing at terminal C may comprise the chrominance signal output of the receiver's comb filter apparatus referred to above. The chrominance signal processing circuits 15 include a suitable detection system for recovering a pair of color-difference signals from the received chrominance component. Illustratively, the color-difference signal outputs of the processing circuits 15 comprise I color-difference signals appearing at terminal ICD, and Q color-difference signals appearing at terminal QCD.

The respective Q and I color-difference signal outputs of processing circuits 15 are applied as signal inputs to respective differential amplifiers 19 and 21. Differential amplifiers 19 and 21 also receive control inputs from apparatus to be described subsequently. Matrix circuits 23, illustratively of the general form disclosed in U.S. Pat. No. 4,272,778—Harwood, et al., receive as inputs push-pull versions of the Q color-difference signal, developed by differential amplifier 19 at terminals +Q and −Q, and push-pull versions of the I color-difference signal, developed by differential amplifier 21 at terminals +I and −I. Matrix circuits 23 provide appropriate combinations of the input signals to develop a trio of different color-difference signal outputs.

A G-Y color-difference signal, appearing at matrix output terminal G-Y, is supplied to signal combiner 25 for combination with the luminance signal from terminal Y to form a green color signal at combiner output terminal G. A B-Y color-difference signal, appearing at matrix output terminal B-Y, is supplied to signal combiner 27 for combination with the luminance signal from terminal Y to form a blue color signal at combiner output terminal B. An R-Y color-difference signal, appearing at matrix output terminal R-Y, is supplied to signal combiner 29 for combination with the luminance signal from terminal Y to form a red color signal at combiner output terminal R.

Figure 1A:
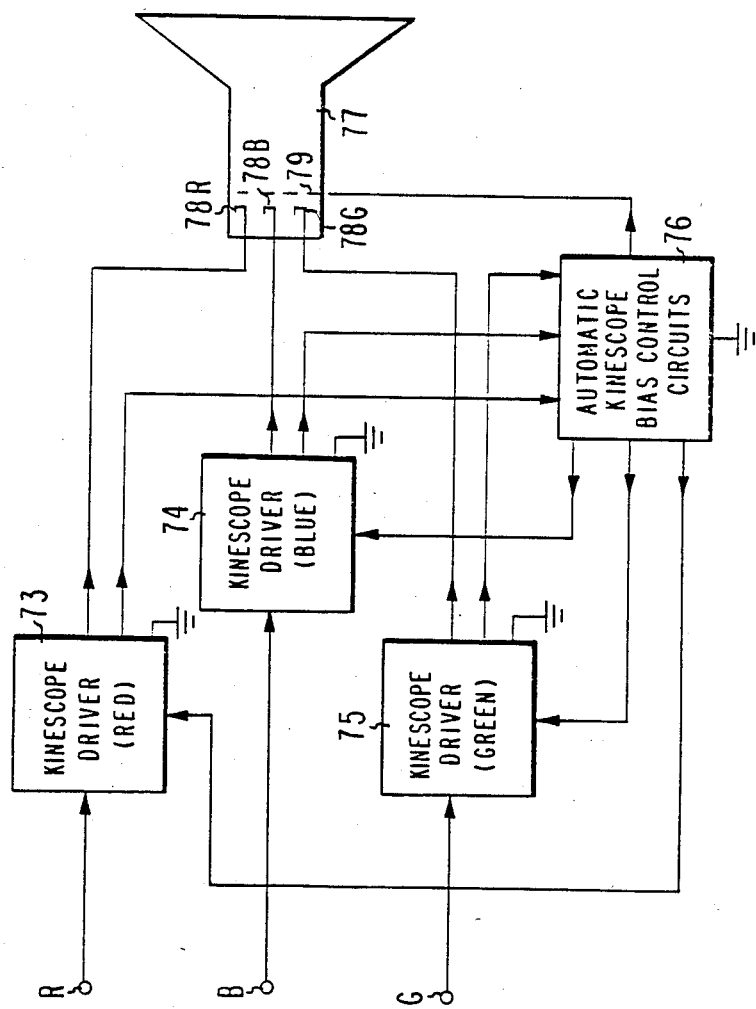
FIG. 1a illustrates, partially schematically and partially by block representation, additional receiver circuitry which may be desirably associated with the system of FIG. 1.

Before considering the DC stabilization system elements of the FIG. 1 arrangement, it is appropriate to consider the FIG. 1a showing of apparatus for utilizing the respective color signals at the combiner output terminals R, B and G. As shown in FIG. 1a, a trio of kinescope drivers 73, 74 and 75 are provided, responsive respectively to the red color signal appearing at terminal R, the blue color signal appearing at terminal B, and the green color signal appearing at terminal G.

Display of color images in response to the trio of color signals is effected on the viewing screen of a color kinescope 77, incorporating an electron gun assembly comprising individually energized cathode electrodes 78R, 78B and 78G and a commonly energized control grid structure 79. The red content of the display color image is determined by control of the intensity of an electron beam emanating from cathode 78R, which is driven by the output of kinescope driver 73. The blue content of the displayed color image is determined by control of the intensity of an electron beam emanating from cathode 78B, which is driven by the output of kinescope driver 74. The green content of the displayed color image is determined by control of the intensity of an electron beam emanating from cathode 78G, which is driven by an output of kinescope driver 75.

The FIG. 1a apparatus also includes automatic kinescope bias control circuits 76, which desirably operate in the manner described in the aforementioned Parker patent. Thus, the bias control circuits 76 includes means for supplying a conduction-enhancing pulse to the kinescope control grid 79 during a predetermined portion of the bias control interval (which interval, illustratively, occupies a period of seven-lines duration during a post-sync portion of each vertical blanking interval of the received signal). The bias control circuits 76 are responsive to inputs derived from the respective drivers (73, 74, 75) for sensing beam current changes induced by the grid pulsing, and develop therefrom respective DC outputs for application to the respective drivers (73, 74, 75) to suitably control the biases of the respective kinescope cathodes (78R, 78B, 78G), to which the driver outputs are DC coupled.

The manner in which the DC levels of the respective color signal inputs to the drivers (73, 74, 75) are controlled will now be explained, with reference to a stabilization system illustrated in FIG. 1, which includes a trio of keyed voltage comparators 31, 33 and 35. Each of the comparators 31, 33 and 35 is enabled only during keying periods established by keying pulses delivered to terminal K from a pulse source (50) to be explained subsequently.

Comparator 31 accepts the green color signal from terminal G for comparison with a reference input derived from a reference voltage terminal RV, and develops its output across a storage capacitor 32. The red color signal at terminal R is subject to comparison with the same reference voltage (from terminal RV) in comparator 33, which develops its output across storage capacitor 34. The blue color signal at terminal B is also subject to comparison with the reference voltage appearing at terminal RV in comparator 35, which develops its output across storage capacitor 36.

A DC potential is developed across capacitor 32 which is representative of the difference, if any, existing between the green signal and reference inputs to comparator 31 during the aforementioned keying periods, and is held during the intervals between successive keying periods. This DC potential is supplied as an input to differential amplifier 19, to modify the DC level of the Q color-difference signal inputs to matrix circuits 23 in a direction tending to reduce the difference between the inputs of comparator 31. Similarly, the DC potential stored across capacitor 34 (representative of the difference, if any, existing between the red signal and reference inputs to comparator 33 during the keying periods) is supplied as an input to differential amplifier 21, to modify the DC level of the I color-difference signal inputs to matrix circuits 23 in a direction tending to reduce the difference between the inputs of comparator 33.

The DC potential stored across capacitor 36, which is representative of the difference, if any, existing between the blue signal and reference inputs to comparator 35 during the keying periods, is utilized as a control input to the luminance signal processing circuits 13 to modify the DC level of the luminance signal input to combiners 25, 27, 29 in a direction tending to reduce the difference between the inputs of comparator 35.

In the system of FIG. 1, the keying pulses delivered to terminal K are developed by a field-rate blanked backporch gating pulse source 50. The train of pulses provided by source 50 comprise keying pulses recurring at a line rate with a timing permitting coincidence with a backporch segment of those horizontal retrace intervals that occur during the active scan periods that intervene between successive vertical blanking intervals.

The operation of the control loops utilizing the keyed comparators (31, 33, 35) stabilizes the blanking levels of the respective color signals (which are exhibited during such backporch segments) at the level of the common reference voltage available at terminal RV.

A field-rate blanking of keying pulses developed by source 50 occurs, however, during the portion of each vertical blanking interval occupied by the vertical synchronizing component (a serrated vertical sync pulse, of a three-line duration) to effect an interruption of keying pulse appearances at terminal K. The reason for interrupting keying pulse appearances during the vertical sync interval is that the keying periods that would otherwise be provided during such interval will coincide, not with exhibitions of the blanking level of the received signal, but rather with exhibitions of the sync peak level of the received signals. The consequence of a build-up of an erroneous correction voltage on the respective storage capacitors (32, 34, 36) is avoidable by eliminating comparator keying during the vertical sync interval.

Ideally, the field-rate blanking of keying pulse development by source 50 should eliminate every instance of comparator keying during the vertical sync interval to maximize protection against error. In practice, however, it has been found that adequate protection against the adverse effects of keying within the vertical sync interval can be achieved with a form of field rate blanking that permits an initial instance of comparator keying at the beginning of the vertical sync interval while barring comparator keying during the remainder of the vertical sync interval.

Figure 2:
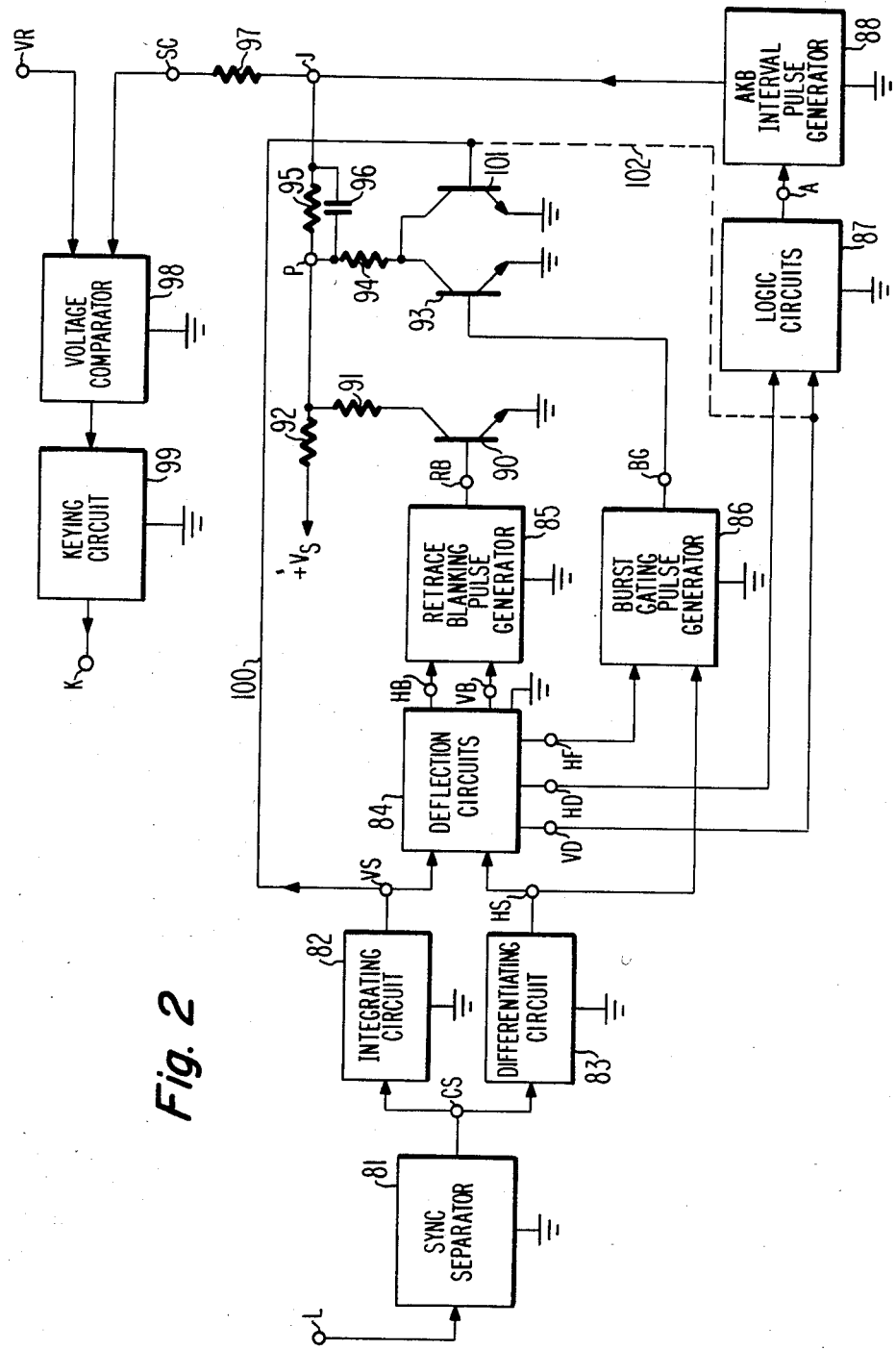
FIG. 2 shows, partially schematically and partially by block representation, an illustrative circuit arrangement for implementing the function of a backporch gating pulse source in the system of FIG. 1.

A particular example of a circuit arrangement for implementing the function of the field-rate blanked backporch gating pulse source 50 of the FIG. 1 system is presented in FIG. 2. In particular, FIG. 2 shows a color television receiver portion incorporating a trilevel sandcastle pulse encoding/decoding system, in which an output of a sandcastle decoder supplies keying pulses to terminal K of the FIG. 1 system, and in which the desired field-rate blanking of backporch keying pulses is achieved by apparatus associated with the sandcastle pulse encoder.

Where a multiplicity of keying functions with different timing requirements are subject to performance within a common integrated circuit, a savings in terminal count may be realized by externally forming a composite multilevel keying waveform for delivery to a single input terminal of the integrated circuit, and including within the integrated circuit level-sensitive decoder circuits for extracting respective keying waves of different timing from the delivered composite waveform (which is viewable as having a sandcastle-like profile). In color television receivers of the type considered here (incorporating AKB control circuits), use of sandcastle pulses of a trilevel form has been found appropriate, as explained in two copending U.S. patent applications of J. Hettiger, entitled respectively "Trilevel Sandcastle Pulse Encoder" Ser. No. 561,333 and "Trilevel Sandcastle Pulse Encoding/Decoding System" Ser. No. 561,330, both filed concurrently herewith. In FIG. 2, a trilevel sandcastle pulse encoding/decoding system of the Hettiger type is subject to modification to implement the aims of the present invention.

In FIG. 2, the receiver's sync separator 81 accepts as an input luminance signals from terminal L of the FIG. 1 system. At the separator output terminal CS appears a composite sync waveform (separated from the remainder of the received signal). Signals from terminal CS are commonly applied to an integrating circuit 82 and to a differentiating circuit 83. Separated vertical synchronizing pulses, formed by integration of the composite sync waveform, appear at the integrating circuit output terminal VS. Separated horizontal synchronizing pulses, formed by differentiation of the composite sync waveform, appear at the differentiating circuit output terminal HS. Signals from terminals VS and HS are supplied to the receiver's deflection circuits 84 to synchronize the development therein of respective field and line scanning waveforms (used in deflection of the beams of color kinescope 77 of FIG. 1a). Available at respective output terminals VD, HD, HF, VB and HB of the deflection circuit 84 are, respectively, a train of vertical drive pulses, a train of horizontal drive pulses, a train of horizontal flyback pulses, a train of vertical retrace blanking pulses, and a train of horizontal retrace blanking pulses.

Signals from terminals HB and VB of the deflection circuits 84 are supplied to a retrace blanking pulse generator 85 which forms composite retrace blanking waves at its output terminal RB. The composite retrace blanking waves illustratively comprise a train of negative-going retrace blanking pulse components, inclusive of relatively wide pulse components, recurring at a field rate, which encompass the recurring periods of vertical retrace of the beams of color kinescope 77, and narrower pulse components, recurring at a line rate, which encompass periods of horizontal retrace of said beams lying outside of the vertical retrace blanking intervals. The signals at terminal RB are applied to the base electrode of an NPN transistor 90, disposed with its emitter electrode grounded, and with its collector electrode linked by a resistor 91 to a terminal P. A resistor 92 is connected between terminal P and the positive terminal ($+V_S$) of an operating potential supply.

Signals from the differentiating circuit output terminal HS and from terminal HF of the deflection circuits 84 are supplied as inputs to a burst gating pulse generator 86. The burst gating pulse generator 86 is illustratively of the type disclosed in a copending U.S. patent application (Ser. No. 527,889) of R. Fernsler et al. The output of generator 86 at its output terminal BG illustratively comprises a train of negative-going burst gating pulse components (narrower in width than the horizontal retrace blanking pulse components) which continuously recur at a line rate, and which are timed to coincide with backporch segments of the horizontal blanking portions of those line intervals that lie outside the vertical blanking interval. It will be noted that the train of pulses at terminal BG includes pulse components falling within the vertical sync interval. The pulses at terminal BG are supplied to the base electrode of an NPN transistor 93, disposed with its emitter electrode grounded, and with its collector electrode connected to terminal P via a resistor 94.

For the purposes of the present invention, the emitter-collector path of transistor 93 is shunted by the emitter-collector path of another NPN transistor 101 (disposed with its emitter electrode grounded, and with its collector electrode directly connected to the collector electrode of transistor 93). Vertical sync pulses (of positive-going form) from terminal VS are applied to the base electrode of transistor 101.

Signals from terminals VD and HD of deflection circuits 84 are supplied as inputs to logic circuits 87. The logic circuits 87 function to develop a kinescope bias control interval timing pulse output at output terminal A, for delivery as a keying input to the AKB interval pulse generator 88. The aforementioned copending Parker patent application discloses a suitable arrangement for implementing the function of logic circuits 87. Illustratively, the train of pulses at terminal A comprise recurring field rate pulses timed to occupy a seven-line period within a post-sync portion of the vertical blanking interval of the received signals, which period defines the automatic kinescope bias (AKB) control interval. During each pulse appearance at terminal A, generator 88 is keyed to function as a low impedance voltage source, effectively clamping its output terminal (J) to a predetermined positive DC level. Terminal J is linked to the previously mentioned terminal P by a resistor 95 (shunted by a speed-up capacitor 96), which exhibits an impedance which is large relative to the output impedance of generator 88 in its keyed state. Between pulse appearances at terminal A, generator 88 is effectively open-circuited to exhibit an output impedance which is large relative to the impedance exhibited by resistor 95.

The circuitry of FIG. 2 thus far described cooperates to develop a sandcastle pulse of trilevel form at terminal J in a manner now to be explained. In the initial explanation, the effect of the operation of transistor 101 will not be considered.

During each AKB control interval, terminal J is clamped to a positive level determined by the output of generator 88 and is substantially unaffected by the voltage excursions appearing at terminal P. The voltage provided by generator 88 functioning as a keyed low impedance voltage source establishes the middle pulse level of the trilevel sandcastle pulses. During periods outside the recurring AKB control intervals, the open-circuiting of generator 88 permits terminal J to follow excursions at terminal P. These excursions vary between a retrace blanking pulse level (lower than the middle pulse level), a burst gating pulse level (higher than the middle pulse level), and a base level, (lower than the retrace blanking pulse level). The manner in which these levels are established at terminal P will now be explained.

During periods when negative-going pulse components are absent from both of the terminals RB and BG (e.g., during active scan times), transistors 90 and 93 are both strongly conducting. The voltage level at terminal P under these circumstances (i.e., the base level) is determined by the voltage division ratio of a voltage divider formed by resistor 92 in series with the parallel combination of resistors 91 and 94 across the operating potential supply terminals.

During portions of the retrace blanking intervals not overlapping with the burst gating intervals, transistor 90 is cut off while transistor 93 remains strongly conducting. The voltage level at terminal P under these circumstances (i.e., the low, retrace blanking, pulse level) is determined by the voltage division ratio of a voltage divider formed by resistor 92 in series with resistor 94 across the operating potential supply terminals.

During each burst gating interval (always overlapping a retrace blanking interval portion), transistors 90 and 93 are both cut off. The voltage level at terminal P under these circumstances (i.e., the high, burst gating, pulse level) is determined by the undivided output potential of the operating potential supply associated with terminal $+V_S$.

The trilevel sandcastle pulses at terminal J are coupled via resistor 97 to terminal SC, which is illustratively an input terminal of the integrated circuit upon which circuits of the FIG. 1 system are realized. Signals at terminal SC are supplied as a signal input to a voltage comparator 98. Comparator 98 (a part of an on-chip sandcastle pulse decoder) serves to compare the incoming sandcastle pulses with a reference voltage from terminal VR. The level of the reference voltage at terminal VR is selected to lie between the middle (AKB) and high (burst gating) pulse levels of the trilevel sandcastle pulses. An on-chip keying circuit 99 responds to the output of comparator 98 by delivering a keying pulse to terminal K of the FIG. 1 system whenever comparator 98 indicates that the reference voltage at terminal VR has been exceeded by the level of the sandcastle pulse train.

As thus far explained (i.e., without consideration of the operation of transistor 101), the sandcastle pulse encoder will permit excursions at terminal P to the high burst gating pulse level during the vertical sync interval, and such excursions will be translated by the decoder 98-99 into keying pulses appearing at terminal K during the vertical sync interval. This is not the result when the operation of transistor 101 is additionally considered, however. During each vertical sync pulse appearance, transistor 101 is rendered strongly conducting by the signal from terminal VS. During such periods, the effect of a cut off of transistor 93 does not result in a rise of the potential at terminal P to the high, burst gating, pulse level. That is, conduction by transistor 101 continues the connection of voltage divider 92/94 across the operating potential supply terminals so as to maintain the low (retrace blanking) pulse level. The absence of excursions to the high burst gating pulse level at terminal P during the vertical sync interval results in a concomitant failure of keying circuit 99 to deliver keying pulses to terminal K during such absence.

In practical realizations of integrating circuit 82, the rise of the output at terminal VS may not be fast enough to ensure preclusion of a first keying pulse development during the vertical sync interval, but preclusion is assured throughout the remainder of the vertical sync interval. As suggested by the dotted-line in FIG. 2, an alternative to the use of the signals at terminal VS for driving transistor 101 is the use of the vertical drive pulses at terminal VD for driving transistor 101. Yet another manner of implementing the principles of the present invention is presented in the copending U.S. patent application Ser. No. 561,332 of T. Yost, entitled "Backporch Gating Pulse Generator Subject To Disabling During Vertical Sync Interval", and concurrently filed herewith. In the Yost arrangement, transistor 101 is not required, as the desired suppression is provided by generator 86 (via a modification of the burst gating pulse generator of the aforementioned Fernsler, et al. application).

What is claimed is:

1. In a color television receiver for displaying color images in response to composite video signals inclusive of respective image-representative luminance and chrominance signal components and line-rate and field-rate deflection synchronizing components, said image-representative components being absent during a vertical blanking portion of each field interval and during horizontal blanking portions of line intervals lying outside of said vertical blanking portions, said field rate deflection synchronizing component appearing during a succession of line intervals within each of said vertical blanking portions; said receiver including a luminance signal channel for processing said luminance signal component, a chrominance signal channel for processing said chrominance signal component and recovering therefrom first and second color-difference signals, and signal combining means responsive to said first and second color-difference signals and said processed luminance signal components for forming first, second and third color signals; a DC stabilization system comprising:

a source of line rate keying pulses;

a first control loop for controlling the DC level of said first color signal formed by said signal combining means;

a second control loop for controlling the DC level of said second color signal formed by said signal combining means; and a third control loop for controlling the DC level of said third color signal formed by said signal combining means;

wherein each of said control loops includes a keyed voltage comparator for comparing a respectively different one of said color signals with a common reference voltage during recurring keying periods defined by the line rate keying pulses provided by said source; and wherein said source of line rate keying pulses is rendered responsive to field rate pulses indicative of the timing of the appearance of said field rate deflection synchronizing component in such manner as to preclude keying of said voltage comparator during at least some of said succession of line intervals.

2. Apparatus in accordance with claim 1, wherein the timing of said line rate keying pulses provided by said source is such as to coincide with the backporch segments of the horizontal blanking portions of said line intervals lying outside said vertical blanking portions.

3. Apparatus in accordance with claim 2 wherein the output of the keyed comparator of said first control loop is used to adjust the DC level of the luminance signal input to said signal combining means, wherein the output of the keyed comparator of said second control loop is used to adjust the DC level of said first color-difference signal input to said signal combining means, and wherein the output of the keyed comparator of said third control loop is used to adjust the DC level of said second color-difference signal input to said signal combining means.

4. Apparatus in accordance with claim 3, wherein said receiver also includes a color kinescope having a plurality of beam intensity control electrodes for controlling the intensity of respective ones of a plurality of electron beams tracing a raster of scanning lines upon a viewing screen, each of said control electrodes receiving a respectively different one of said color signals; and means for automatically controlling the biases on the respective control electrodes during periodic bias control intervals encompassing a plurality of line intervals falling subsequent to said succession of line intervals within each of said vertical blanking portions; and wherein the line rate keying pulses provided by said source are subject to interruption during said plurality of subsequent line intervals.

5. Apparatus in accordance with claim 4 wherein said luminance signal channel, said chrominance signal channel and said signal combining means comprise circuits realized on a common, monolithic integrated circuit; and wherein said source of line rate keying pulses comprises:

a trilevel sandcastle pulse encoder, external to said integrated circuit, for forming a train of trilevel sandcastle pulses in response to a first train of monolevel pulses encompassing periods of retrace for said beams, to a second train of monolevel pulses, each of the pulses of said second train overlapping in time a portion of a pulse of said first train, and to a third train of monolevel pulses timed to coincide with said periodically recurring bias control intervals; wherein said train of trilevel sandcastle pulses exhibits the highest of its three pulse levels during said backporch segments and exhibits the middle one of said three pulse levels throughout said bias control interval;

a voltage comparator, realized on said integrated circuit, for comparing said train of trilevel sandcastle pulses with a reference voltage of a level intermediate said highest and said middle one of said pulse levels; and means, realized on said integrated circuit and responsive to an output of said voltage comparator, for forming said line rate keying pulses when the level of said trilevel sandcastle pulse train exceeds said reference voltage; and wherein said trilevel sandcastle pulse encoder includes means responsive to said field rate pulses for barring excursions of said trilevel sandcastle pulse train to said highest level during at least some of the line intervals in said succession of line intervals.

6. Apparatus in accordance with claim 5 wherein said trilevel sandcastle pulse encoder also includes:

a source of DC potential;

first and second resistors; and a first transistor having a base electrode connected to receive said second train of monolevel pulses, and an emitter-collector path disposed in series with said first and second resistors across said source of DC potential;

wherein the level exhibited by said train of trilevel sandcastle pulses during periods outside of said bias control intervals is determined in accordance with the voltage appearing at the junction of said first and second resistors; and wherein said excursion barring means comprises a second transistor having a base electrode connected to receive said field rate pulse, and an emitter-collector path connected in shunt with the emitter-collector path of said first transistor.

7. Apparatus in accordance with claim 6 wherein said first transistor is cut off in response to an appearance of a pulse of said second train, and wherein said second transistor is rendered conducting during at least a portion of each period of appearance of said vertical synchronizing component in response to said field rate pulses.

* * * * *